United States Patent
Vandermolen

(10) Patent No.: US 6,193,297 B1
(45) Date of Patent: Feb. 27, 2001

(54) INTEGRATED ACTIVE SEAT SUSPENSION AND SEAT LOCKUP DEVICE

(75) Inventor: Gary L. Vandermolen, Fort Wayne, IN (US)

(73) Assignee: Navistar International Transportation Corp., Chicago, IL (US)

(*) Notice: Subject to any disclaimer, the term of this patent is extended or adjusted under 35 U.S.C. 154(b) by 0 days.

(21) Appl. No.: 09/566,865

(22) Filed: May 8, 2000

Related U.S. Application Data

(62) Division of application No. 09/264,788, filed on Mar. 9, 1999.

(51) Int. Cl.[7] ..................................................... B60N 2/02
(52) U.S. Cl. .................. 296/68.1; 296/65.02; 296/65.01; 296/65.08; 297/216.15; 297/216.16; 297/216.17; 180/282
(58) Field of Search ............................... 296/68.1, 65.02, 296/65.01, 65.08; 297/216.15, 216.16, 216.17, 215, 216; 180/282

(56) References Cited

U.S. PATENT DOCUMENTS

| | | |
|---|---|---|
| 4,103,754 | 8/1978 | Ashworth et al. . |
| 4,650,148 | 3/1987 | Sakamoto . |
| 4,729,538 | 3/1988 | Bergacker et al. . |
| 4,793,583 | 12/1988 | Bergacker et al. . |
| 4,822,094 | 4/1989 | Oldfather et al. . |
| 4,892,328 | 1/1990 | Kurtzman et al. . |
| 4,979,763 | 12/1990 | Blackburn . |
| 5,005,894 | 4/1991 | Nagata . |
| 5,144,559 | 9/1992 | Kamimura et al. . |
| 5,176,355 | 1/1993 | Carter . |
| 5,222,709 | 6/1993 | Cully, Jr. et al. . |
| 5,510,986 | 4/1996 | Williams . |
| 5,652,704 | 7/1997 | Catanzarite . |
| 5,669,572 | 9/1997 | Crook . |
| 5,678,847 | 10/1997 | Izawa et al. . |
| 5,812,399 | 9/1998 | Judic et al. . |
| 5,845,730 | 12/1998 | Thuen et al. . |
| 5,883,442 | 3/1999 | Saito . |
| 6,002,975 | 12/1999 | Schiffmann et al. . |
| 6,016,884 * | 1/2000 | Swart et al. .......................... 180/282 |
| 6,036,224 * | 3/2000 | Wachter et al. ...................... 180/282 |
| 6,038,495 * | 3/2000 | Schiffmann ......................... 180/282 |
| 6,052,634 * | 4/2000 | Pathe et al. .......................... 180/282 |
| 6,061,616 * | 5/2000 | Ohno et al. .......................... 180/282 |
| 6,072,246 * | 6/2000 | Schafer ................................ 180/282 |
| 6,072,247 * | 6/2000 | Lammert et al. ..................... 180/282 |
| 6,081,044 * | 6/2000 | Anthofer et al. ..................... 180/282 |

* cited by examiner

Primary Examiner—Joseph D. Pape
Assistant Examiner—Kiran Patel
(74) Attorney, Agent, or Firm—Jeffrey P. Calfa; Dennis K. Sullivan

(57) ABSTRACT

The vehicle seat suspension system of the present invention provides an active seat suspension system responsive to conditions indicative of a collision or rollover for moving the seat downwardly to the limit of its vertical travel. The seat assembly comprises the seat, an active suspension system for maintaining an equilibrium position of the seat, sensors responsive to accident conditions for generating accident indication signals, and a seat positioning signal generator responsive to the accident indication signals for providing a seat relocation signal, where the active suspension system being responsive to the seat relocation signal for moving the seat to a retracted location.

3 Claims, 5 Drawing Sheets

INTEGRATED ACTIVE SEAT SUSPENSION AND SEAT LOCKUP DEVICE

This is a division of application Ser. No. 09/264,788, filed Mar. 9, 1999.

FIELD OF THE INVENTION

The present invention relates to suspension systems for vehicle seats. More particularly, the invention relates to an integrated, active seat suspension system and seat relocation mechanism which provides for lowering the seat during vehicle conditions indicative of an accident.

DESCRIPTION OF THE PROBLEM AND BACKGROUND ART

Suspension systems provide vibration isolation from one part of the vehicle to another. Suspension systems also position a sprung mass relative to an unsprung mass. The vibration producing portion of the vehicle is generally termed the unsprung mass and the section being isolated is called the sprung mass. Vibration isolation may be achieved, in part, by converting high frequency vibration into lower frequency motion of greater amplitude. However, high frequency vibration cannot be converted in an unlimited manner to relatively large amplitude, low frequency movement without seriously compromising the objective of maintaining the preferred spacing of the sprung and unsprung masses.

One example of a system of sprung and unsprung masses are the chassis and the wheels of a motor vehicle. Similarly, the driver and his seat can be isolated from the chassis of the vehicle. Under normal driving conditions, a driver should be kept at a nearly fixed position relative to the controls of the vehicle, and, under extreme conditions, within reach of the controls. However, the objective of keeping the driver properly positioned is not consistent with the object of providing a comfortable ride. Passive and semi-active suspension systems provide for decay of the movement of the sprung mass, typically by use of a friction based damping element such as a viscous fluid shock absorber. Active suspension systems force the return of the sprung mass to a desired, equilibrium position relative to the unsprung mass.

Passive suspension systems usually comprise mechanical springs and viscous fluid or friction shock absorbers for damping movement of the sprung mass relative to the unsprung mass. Such systems have the virtue of simplicity, but the disadvantage of being optimized for a particular frequency. When used for a seat where the Occupant's mass can easily vary from 40 kg. to 150 kg., that frequency may not even be particularly predictable.

Semi-active suspension systems use a spring and a friction type motion damping device. They differ from passive systems in that they provide control of the damping rate of the shock absorber. See for example, U.S. Pat. Nos. 5,582,385 and 5,259,487. By using condition detecting sensors and a microprocessor, control of the damping rate of the shock absorber may be made dynamic.

Active suspension systems require the use of sensors and provide dynamic adaptation to sensed conditions. While active suspension systems typically have a spring they do not have a friction type a motion damping device. Instead, active suspension systems dynamically control the total force applied between sprung and unsprung masses to provide for quickly returning the masses to a predetermined spacing. U.S. Pat. No. 4,892,328 teaches a strut for a vehicle primary suspension combining a mechanical spring and an electromagnetic positioning element. The electromagnetic positioning element of the '328 patent is constructed to provide positioning force axially along a strut like assembly, with the force level proportional to the current supplied and the direction of the force determined by Be diction of the current in the electromagnet. The current applied to the winding is dynamically varied as a function both of linear displacement between the masses and external forces applied along the shaft and may serve to push apart the masses or draw them together.

Passive, semi-active and active suspension systems each have potential application to seat suspension systems. The dynamic response characteristics of the semi-active suspension system of U.S. Pat. No. 5,652,704 allowed the incorporation of additional features in such seat suspension systems, such as automatically deflating air springs upon egress of the driver.

There is frequently a safety advantage to vehicle occupants if their seat position is changed duringa collision or rollover. Generally, an occupant is safer if occupant movement toward the front or the top of the passenger compartment or cab is restrained or if pinning of the occupants in the vehicle can be prevented. Floor mounted belts, if in use by the driver or occupant, partially restrict movement of the seat by squeezing the driver into the seat when the seat moves upward and forward relative to the vehicle during a collision. However, interaction between the belt and upward movement of the seat can contribute to the driver "submarining", that is, the driver being pulled partly below the dash.

U.S. Pat. No. 5,344,204 to Liu discloses a collision detection sensor which operates to release a seat locking mechanism so that compressed springs can force the seat backward toward the rear of the vehicle. The system of Liu is not integrated with the existing seat suspension and as a result adds to the mechanical complexity of the installation.

SUMMARY OF THE INVENTION

It is an object of the invention to prevent vehicle seat movement from promoting occupant excursions into or under interior features of a vehicle passenger compartment as a result of involvement of the vehicle in an accident.

It is another object of the invention to provide for transferring the seat position to a safer location for its occupant during an accident.

It is a further object of the invention to integrate dynamic seat positioning with the seat suspension system.

The vehicle seat suspension system of the present invention meets these and other objectives by providing an active seat suspension system responsive to conditions indicative of a collision or rollover for moving the seat downwardly to the limit of its vertical travel. The seal assembly comprises the seat, an active suspension system for maintaining an equilibrium position of the seat, sensors responsive to accident conditions for generating accident indication signals, and a seat positioning signal generator responsive to the accident indication signals for providing a seat relocation signal, where the active suspension system is responsive to the seat relocation signal for moving the seat to a retracted location.

Additional effects, features and advantages will be apparent in the written description that follows.

DETAILED DESCRIPTION OF THE INVENTION

Figure 1:
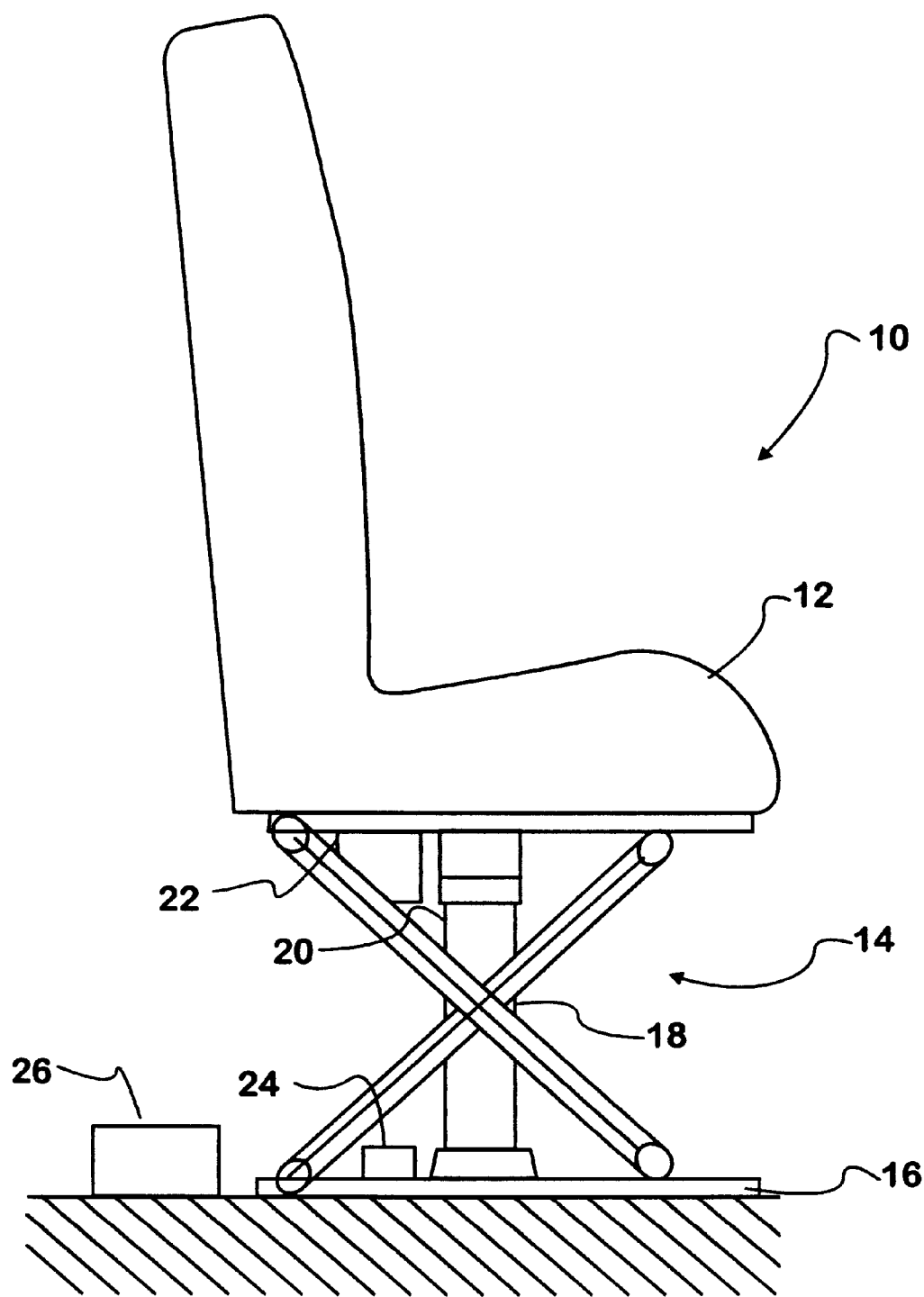
FIG. 1 is a side elevation of a seat assembly incorporating a first embodiment of the invention.

FIG. 1 depicts a seat assembly 10 for use in the passenger compartment of a vehicle, preferably a commercial truck. Seat assembly 10 provides a seating surface 12 for a driver or other vehicle occupant supported on an active suspension system 14 which is in turn mounted on the vehicle frame or floor 16. Active suspension system 14 incorporates a scissors frame 18 connected between seat 12 and floor 16, which allows the seat to move upwardly and downwardly with respect to the floor. Seat suspension system 14 will typically also allow the entire seat assembly 10 to be moved back and forth on floor 16, the details of which have been omitted here.

Active suspension system 14 provides dynamically adjustable restorative forces from a telescoping electromagnet strut 20 positioned under seat 12. In normal operation of seat assembly 10, a preferred height for seat 12, based on the extension of scissors frame 18, is selected, typically by a seat occupant. Current is then applied to electromagnet strut 20 to generate forces from the strut to be applied between seat 12 and floor 16 to maintain this height, herein referred to as the equilibrium height. The electromagnet strut 20 may be bolstered by a mechanical spring. The amount of current applied to electromagnet strut 20 is varied in response the occurrence of outside shocks or vibration to the system, which generally occur through frame or floor 16 and which tend to disturb the equilibrium position of seat 12 or make the ride uncomfortable for the seat occupant. Obviously, restoration of the seat equilibrium position is not instantaneous, but rather is calibrated to isolate the occupant from vibration and smooth the ride.

A number of factors may be monitored to optimize control of electromagnet strut 20. For example, U.S. Pat. No. 5,652,704, which relates to the dynamic control of a damping element in a semi-active seat suspension system, provides sensors monitoring, among other factors: seat height displacement; ride mode selection; vehicle braking; clutch position; gear selection; whether the seat is occupied; steering angle; vehicle speed, and for vehicle rollover. These factors, in addition to others, may be utilized implementing dynamic seat positioning and ride control in either an semi-active or an active suspension system.

The present invention is directed to emergency repositioning of seat 12 away from its equilibrium height using an active seat suspension system. Emergency repositioning is done in response to conditions indicative of an accident involving the vehicle in which seat assembly 10 is installed. Accelerometer 22 may be used to generate a scaled signal indicating deceleration and acceleration, or an on/off indication of deceleration exceeding a threshold value. Rollover sensor 24 will ordinarily provide a simple on/off indication of a rollover condition While the sensors are illustrated as being mounted on seat assembly 10, it is not essential to the operation of the invention that they be located there. The signals generated by accelerometer 22 and rollover sensor 24 are applied to a seat repositioning signal generator 26, which may be implemented in a microprocessor and signal amplifying circuitry.

Figure 2:
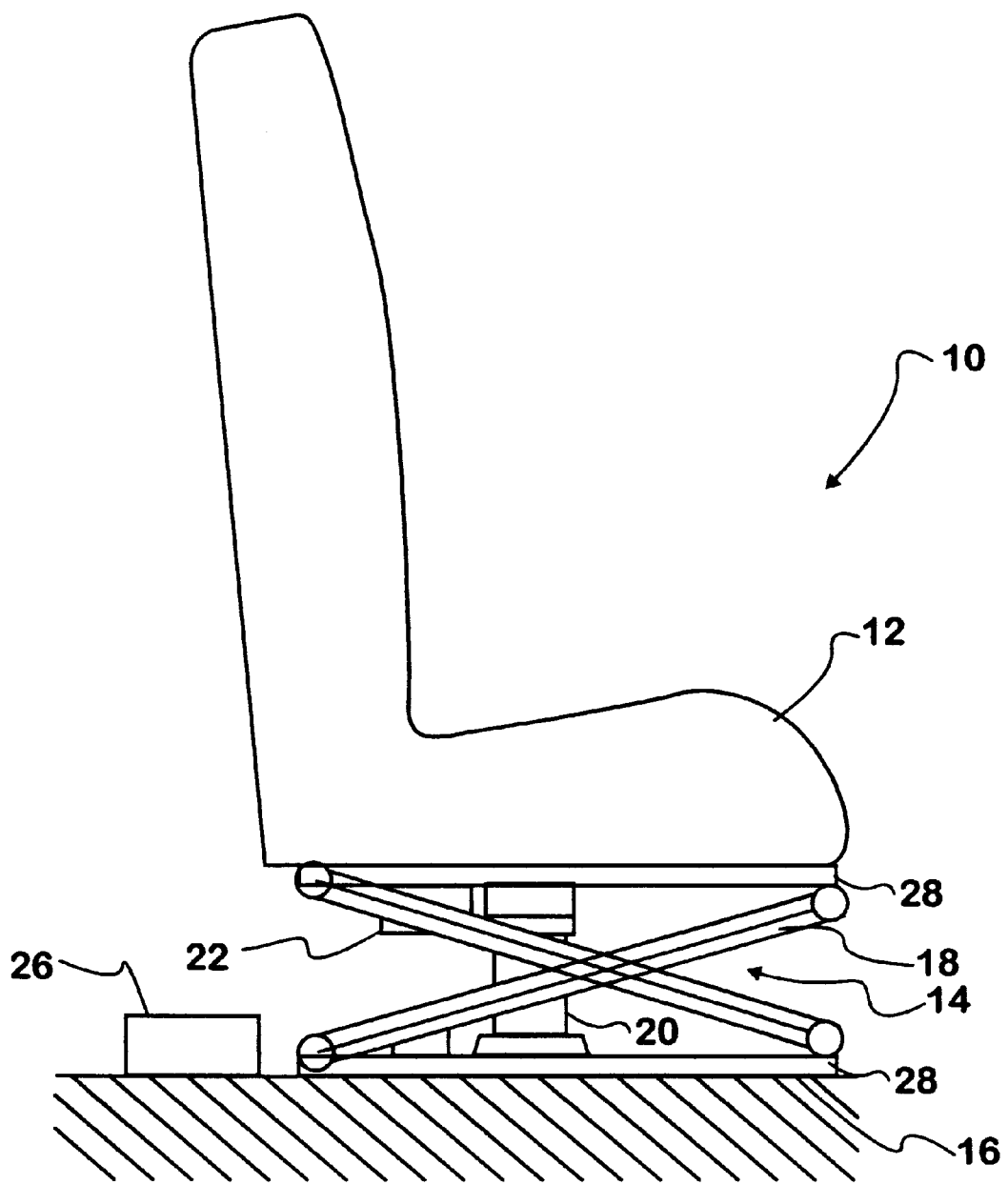
FIG. 2 is a side elevation of the seat assembly of FIG. 1 illustrating the seat in a retracted, lowered position.

FIG. 2 illustrates repositioning of seat 12 to a lower limit of the travel of the active suspension system 14. The travel limit in the illustrated embodiment is defined by the maximum degree of contraction of telescoping electromagnet strut 20 or the degree to which scissors frame 18 may be folded on support rails 28. Because of the potential for loss of vehicle power in an accident, electromagnet strut 20 should respond to a zero or null level seat positioning signal by lowering seat 12 to its lower limit of the travel. A null signal naturally results in a zero force being produced by the electromagnet. A mechanical spring may also be provided tending to draw (or push) seat 12 to a minimum height position.

Figure 3:
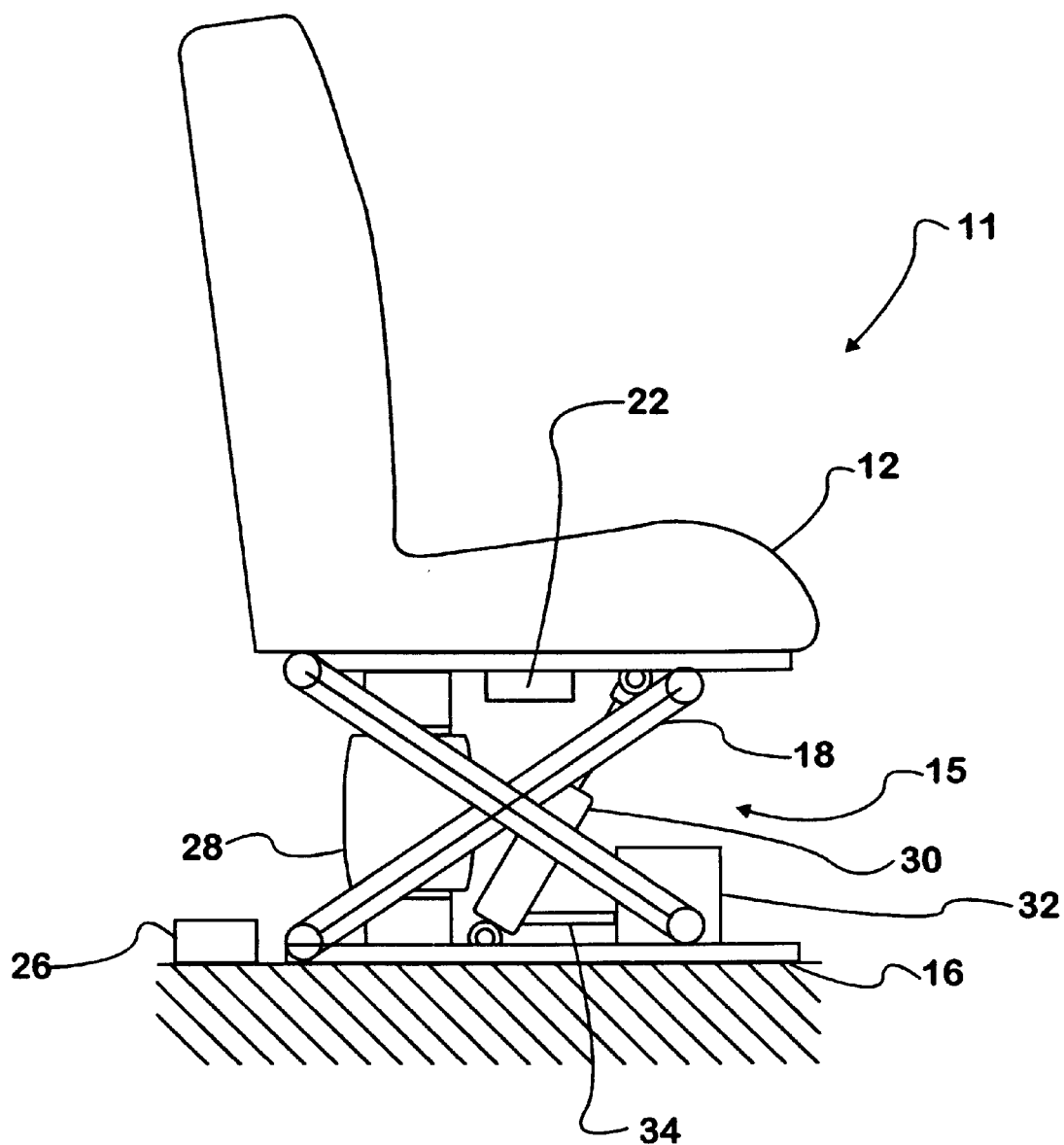
FIG. 3 is a side elevation of a seat assembly incorporating a second embodiment of the invention.

FIG. 3 illustrates a second embodiment of the invention incorporating an hydraulically based active suspension system 15 as part of seat assembly 11. The key differences between active suspension system 15 and active suspension system 14 are the providing of an air spring 28 (alternatively a mechanically loaded compression spring could be used) and an hydraulic strut 15 to provide controlled restorative force for positioning seat 12.

Superficially, active suspension system 15 resembles passive and semi-active suspension systems, however, hydraulic strut 15 is not a viscous damping device of the type having restricted. communication between compression and rebound chambers, but rather an extensible element which is fed pressurized hydraulic fluid from, or has fluid withdrawn by, a strut controller 32.

Strut controller 32 is actuated by a seat positioning signal produced by the seat positioning signal generator responsive to accident indication signals from accelerometer 22 and rollover sensor 24 (shown in FIGS. 1 and 2). To lower seat assembly 11 to the lower end of its travel with seat 12 at its nearest approach to floor 16, generator 26 issues a seat retraction signal, which is preferably a null signal so that the default position is the lowered position. Responsive to the seat retraction signal, strut controller 32 transfers hydraulic fluid to and from the appropriate chambers in hydraulic strut 30 to lower the height of seat assembly 11.

Figure 4:
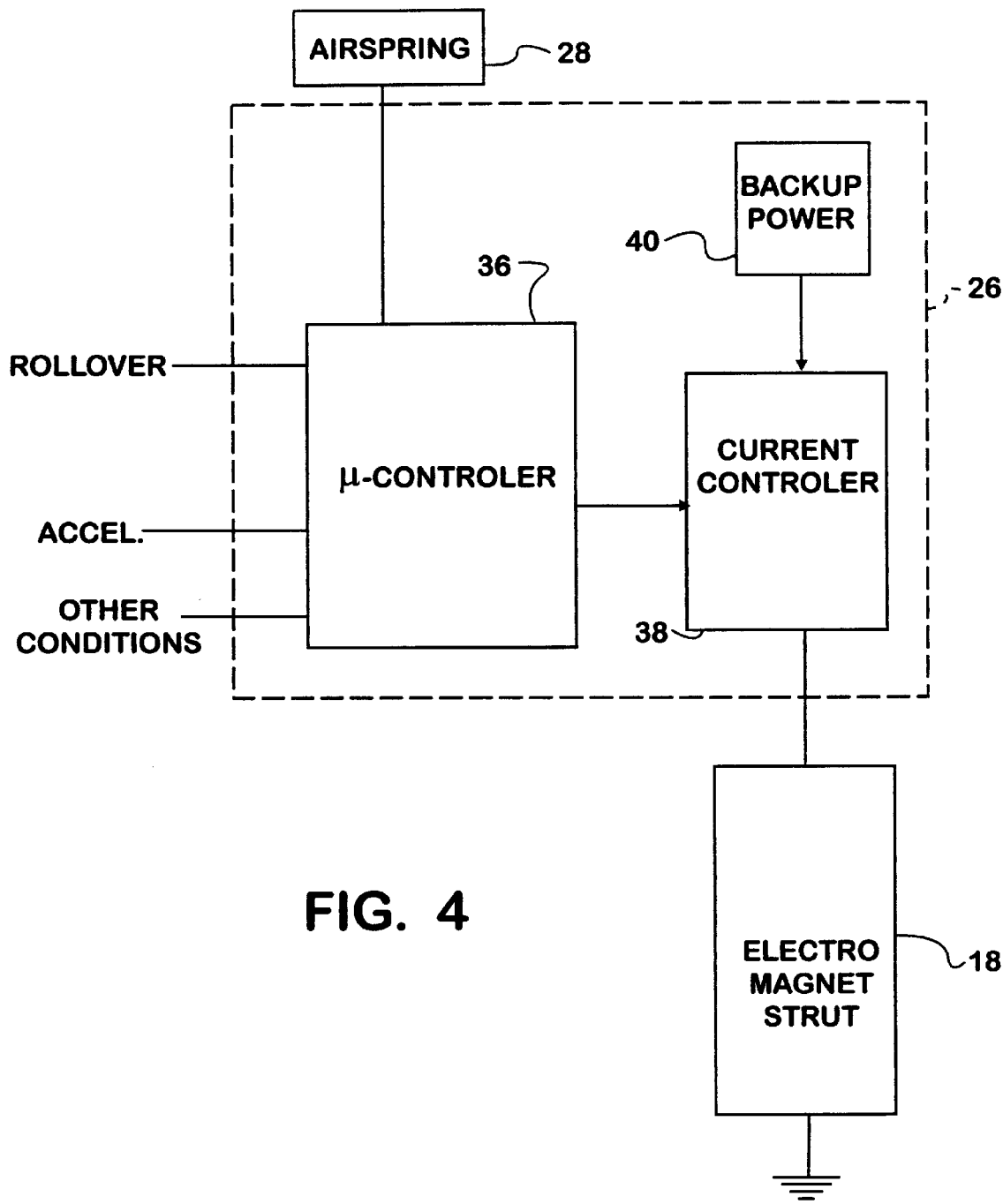
FIG. 4 is a schematic of a control arrangement incorporating the first embodiment of the invention with an active se suspension.
Figure 5:
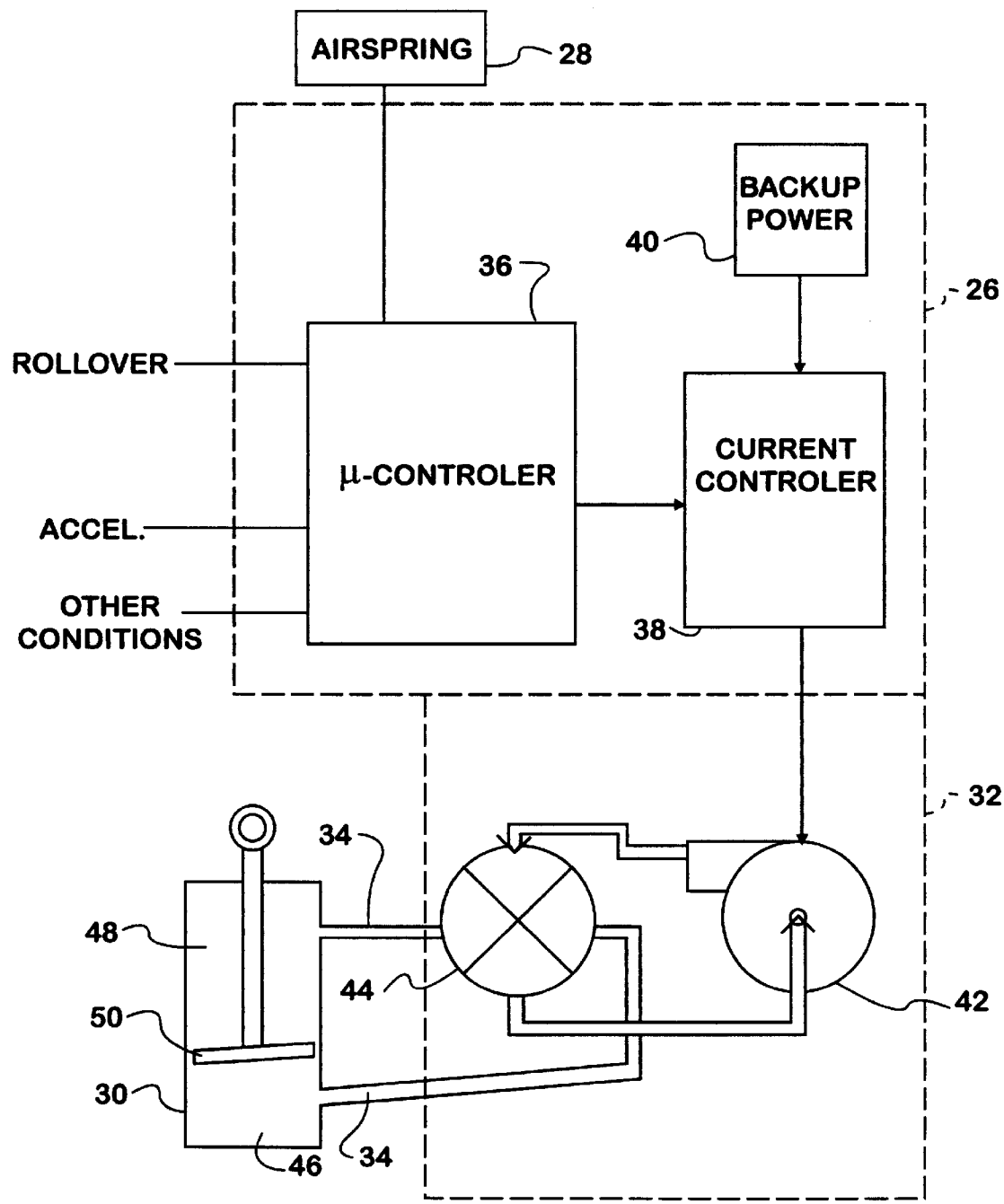
FIG. 5 is a schematic of a control arrangement for a second embodiment of the invention with an active seat suspension.

FIGS. 4 and 5 are schematic illustrations of the control arrangements for implementing the emergency positioning functions of the invention. Seat positioning signal generator 26 comprises a microcontroller 36 adapted to receive input signals from the rollover sensor 24 and the accelerometer 22 relating to possible accident conditions involving the vehicle. Microcontroller 36, also receives inputs from other sensors responsive to which it handles dynamic maintenance of the equilibrium position of seat 12. Microcontroller 36 may also provide coordinated deflation of airspring 28, if present.

Seat positioning signal generator 26 further comprises a current controller 38 which generates a scaled seat positioning signal calculated to generate the forces required for returning seat 12 to its equilibrium position. In response to an emergency situation, indicated by a null level signal from microcontroller 36, current controller 38 applies a positioning signal to the seat height control element for collapsing the seat position. Where restorative forces are generated by electromagnet 18, a null seat positioning signal eliminates any force on the seat from the electromagnet strut 20.

The arrangements for an hydraulic strut 30 are more complex than for an electromagnet. As illustrated for hydraulic strut 30, the seat positioning signal may be applied to control the speed of a pump 42. Synchronized with pump operation, microcontroller 36 sets the position of a valve 44, which is connected by hoses 34 to the compression chamber 46 and the rebound chamber 48 of strut 30 and the to intake and outlet of pump 42. By selective positioning of valve 44 rebound chamber 48 may be connected to either the inlet of pump 42, for drawing hydraulic fluid from the chamber, or the rebound chamber 48 may be connected to the outlet of pump 42 to receive hydraulic fluid from pump 42. When valve 44 connects rebound chamber 48 to the outlet of pump 42 it simultaneously connects the compression chamber 46 to the inlet of pump of 42 so that fluid is transferred from compression chamber 46 to the rebound chamber 48 thereby generating a downward force on piston 50, tending to collapse the hydraulic strut 30. Conversely, when valve 44 is set to connect the rebound chamber 48 to the inlet of pump 42, then the compression chamber 46 is connected to the outlet of pump 42, resulting in fluid being transferred from the rebound chamber to the compression chamber and an upward, outward force being applied to piston 50.

Those skilled in the art will now realize that fluid can be transferred between the chambers of hydraulic strut 30 in a number of ways, or drained from the strut all together, to achieve the desired ends of the invention.

The present invention lowers a vehicle seat under accident conditions, helping prevent motion of the occupant toward or under the dash of the vehicle and the ceiling of the passenger compartment. The invention is filly integrated with an active seat suspension system thereby avoiding the complexity of providing a second seat positioning system, the operation of which could conflict with the primary functions of a seat suspension system in maintaining seat position and providing a comfortable ride.

While the invention is shown in only one of its forms, it is not thus limited but is susceptible to various changes and modifications without departing from the spirit and scope of the invention.

What is claimed is:

1. A seat assembly for installation on a vehicle, the seat assembly comprising:
   (a) a seat having a vertical travel with a lower limit relative to the vehicle;
   (b) accident sensors responsive to accident conditions for generating accident indication signals;
   (c) a seat positioning signal generator responsive to an accident indication signal, for providing a seat positioning signal at a retraction level;
   (d) means for positioning the seat in its vertical travel, being responsive to the retraction level signal for dropping the seat to the lower limit of its vertical travel;
   (e) sensors responsive to selected vehicle conditions for generating seat height correction signals;
   (f) the seat positioning signal generator being further responsive to the motion sensors for providing a dynamic variable level seat positioning signal, and
   (g) said means for vertically positioning the seat further comprises a spring; and an electrohydraulic valve responsive to the seat positioning signal.

2. A seat assembly for installation on a vehicle, the seat assembly comprising:
   (a) a seat having a vertical travel with a lower limit relative to the vehicle;
   (b) accident sensors responsive to an accident conditions for generating accident indication signals;
   (c) a seat positioning signal generator responsive an accident indication signal, for providing a seat positioning signal at a retraction level;
   (d) means for positioning the seat in its vertical travel, being responsive to the retraction level signal for dropping the seat to the lower limit of its vertical travel;
   (e) sensors responsive to selected vehicle conditions for generating seat height correction signals;
   (f) the seat positioning signal generator being further responsive to the motion sensors for providing a dynamic variable level seat positioning signal;
   (g) said retraction level signal is a null signal;
   (h) said accident sensors include an accelerometer responsive to deceleration for generating a collision signal and an attitude sensor responsive to rollover of the vehicle for generating a rollover signal;
   (i) said means for vertically positioning the seat further comprises a spring; and an electrohydraulic valve responsive to the seat positioning signal.

3. A seat assembly for a vehicle, comprising:
   (a) a seat;
   (b) an active suspension system for maintaining an equilibrium position of the seat;
   (c) sensors responsive to an accident condition for generating accident indication signals;
   (d) means responsive to the accident indication signals for providing a seat relocation signal;
   (e) the active suspension system being responsive to the seat relocation signal for moving the seat to a retracted location;
   (f) said equilibrium position of the seat is user selected and the active suspension system dynamically counters movement of the seat away from the equilibrium position absent the seat relocation signal;
   (g) said retracted location for the seat is adjacent a passenger compartment floor in a vehicle, and
   (h) said active suspension system includes a spring and an electrohydraulic strut and the seat relocation signal is a null signal resulting in drainage of the electrohydraulic strut and its subsequent collapse.

\* \* \* \* \*